(12) United States Patent
Iacaruso et al.

(10) Patent No.: US 12,242,831 B2
(45) Date of Patent: Mar. 4, 2025

(54) OPTIMIZED COMPILER TOOLCHAIN QUALIFICATION FOR FUNCTIONAL SAFETY COMPLIANCE

(71) Applicant: Intel Corporation, Santa Clara, CA (US)

(72) Inventors: Maurizio Iacaruso, Lucca (IT); Stefano Dell'Osa, Naples (IT); Srikanth Kaniyanoor Srinivasan, Bangalore (IN); Kevin Smith, High Wycombe (GB)

(73) Assignee: Intel Corporation, Santa Clara, CA (US)

(*) Notice: Subject to any disclaimer, the term of this patent is extended or adjusted under 35 U.S.C. 154(b) by 154 days.

(21) Appl. No.: 18/127,625

(22) Filed: Mar. 28, 2023

(65) Prior Publication Data

US 2024/0329947 A1 Oct. 3, 2024

Related U.S. Application Data

(60) Provisional application No. 63/423,946, filed on Nov. 9, 2022.

(51) Int. Cl.
*G06F 8/41* (2018.01)
(52) U.S. Cl.
CPC ..................... *G06F 8/41* (2013.01)
(58) Field of Classification Search
None
See application file for complete search history.

(56) References Cited

U.S. PATENT DOCUMENTS

| | | | | |
|---|---|---|---|---|
| 11,360,870 | B2* | 6/2022 | Iacaruso | G06F 11/0754 |
| 2019/0171538 | A1* | 6/2019 | Gulati | G06T 1/20 |
| 2024/0289098 | A1* | 8/2024 | Li | G06F 8/30 |
| 2024/0329947 | A1* | 10/2024 | Iacaruso | G06F 8/41 |

OTHER PUBLICATIONS

Gallina, "Towards an ISO 26262-compliant OSLC-based Tool Chain Enabling Continuous Self-assessment", 2016, IEEE (Year: 2016).*

(Continued)

*Primary Examiner* — Hossain M Morshed
(74) *Attorney, Agent, or Firm* — Schwegman Lundberg & Woessner, P.A.

(57) ABSTRACT

Various systems and methods for implementing functional safety verification of a software compiler and a compiled software product are disclosed. In an example, verification of functional safety testing requirements includes: generating first code coverage data for a compiler (e.g., a toolchain testsuite code coverage report), the first code coverage data based on a plurality of validation tests of the compiler; performing compilation of a software product (e.g., application, library, operating system) with the compiler; generating second code coverage data (e.g., a toolchain safety application code coverage report) for the compilation of the software product, based on lines of source code invoked in the compiler with the compilation of the software product; and outputting data for verification of functional safety testing requirements based on a comparison of the first code coverage data for the compiler with the second code coverage data for the compilation of the software product.

20 Claims, 5 Drawing Sheets

(56) References Cited

OTHER PUBLICATIONS

Arm, "Components and Tools for Functional Safety Applications", 2021, Arm Developer developer (Year: 2021).*

Unknown, "Arm Compiler for Embedded FuSa", [Online]. Retrieved from the Internet: https: developer.arm.comTools%20and%20Software Arm%20Compiler%20for%20Embedded%20FuSa, (Unknown), 5 pgs.

Unknown, "csmith-project csmith", [Online]. Retrieved from the Internet: https: github.com csmith-project csmith, (Unknown), 4 pgs.

Yang, Xuejun, "Finding and Understanding Bugs in C Compilers", Proceedings of the 32nd ACM SIGPLAN Conference on Programming Language Design and Implementation, (Jun. 2011), 12 pgs.

* cited by examiner

OPTIMIZED COMPILER TOOLCHAIN QUALIFICATION FOR FUNCTIONAL SAFETY COMPLIANCE

PRIORITY CLAIM

This application claims the benefit of priority to U.S. Provisional Patent Application No. 63/423,946, filed Nov. 9, 2022, and titled "OPTIMIZED COMPILER TOOLCHAIN QUALIFICATION METHOD FOR FUNCTIONAL SAFETY COMPLIANCE", which is incorporated herein by reference in its entirety.

TECHNICAL FIELD

The present disclosure relates generally to software compilation technologies and the development of functional safety-related software products.

BACKGROUND

Functional safety standards such as ISO 26262:2018 (hereinafter, "ISO 26262"), IEC 61508:2010 (hereinafter IEC 61508), RTCA DO-178C (hereinafter, "DO-178C), etc., require use of a "qualified" toolchain to build functional safety related software including user space applications, Operating Systems, middleware, etc. Functional safety tool chain qualification activity may require a huge amount of effort, depending on the technique(s) used to perform such activity. When the toolchain involves a compiler (e.g., a software compiler and linker) used for compiling a functional safety-related software product (e.g., software application, a software library, a middleware software component, or an operating system), the qualification effort for compliance with functional safety standards is very significant.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
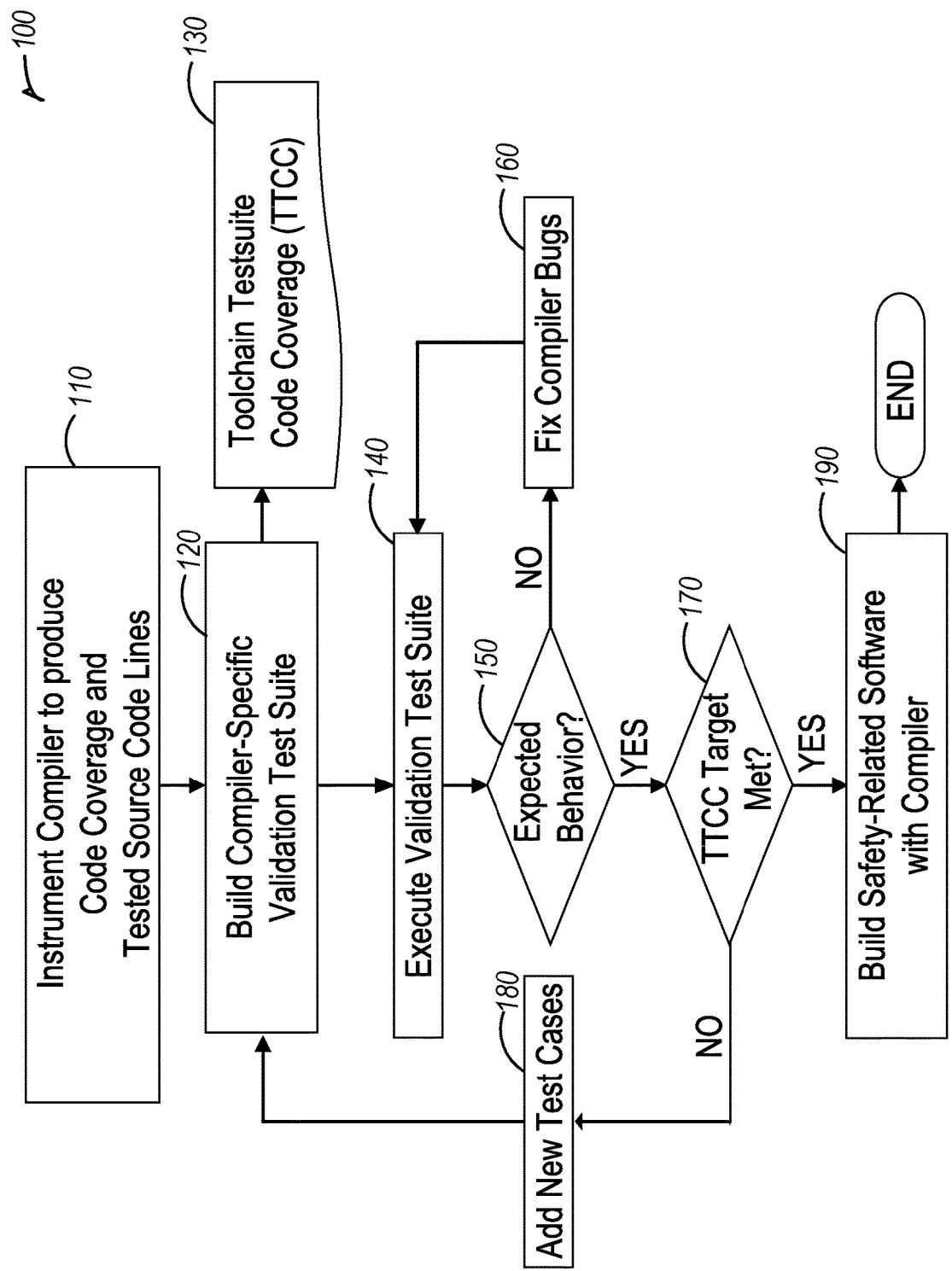
FIG. 1 illustrates a workflow to qualify a compiler tool suite, according to an example.

In the following description, for purposes of explanation, numerous specific details are set forth in order to provide a thorough understanding of some example embodiments. It will be evident, however, to one skilled in the art that the present disclosure may be practiced without these specific details.

The following disclosure relates to functional safety (FuSa) standards and software products that comply with these FuSa standards. FuSa software products may be integrated into a variety of real-world systems, including but not limited to robotics, autonomous vehicles, machinery, and the like, including in manufacturing, industrial, medical, household, and other fields of use.

FuSa standards like ISO 26262, IEC 61508, DO-178C, etc. offer several methods to comply with toolchain qualification requirements. For example, when applied to software, the ISO 26262 standard can be satisfied via mechanisms such as "Increased confidence from use", "Evaluation of tool development process", "Validation of the software tool", and "Development in accordance with a safety standard" as defined in this standard. When a software compiler is used in the toolchain, the ISO 26262 tool qualification method "Validation of the software tool" is typically the primary requirement to satisfy for ISO 26262. Approaches that enable the validation of safety-related software and the compiler used to build such safety-related software are addressed with the following examples.

With existing approaches, tool chain suppliers validate their compilers against very stringent requirements and very high code coverage metrics such as statement coverage, branch coverage, etc. In addition, this validation must be performed with all possible configuration options provided by the compiler. Such requirements increase the overall cost and complexity of the certification. Although a tool chain manufacturer has to consider all possible compiler flags and their combinations, customers may use a very small subset of the configuration flags. Different compiler configuration flags correspond to different compiler features.

The following qualification methodology allows quantification of the portion of compiler source code that is invoked (e.g., stimulated, utilized, used, etc.) during safety related software compilation, to understand if the compiler validation campaign covers the useful (e.g., relevant) compiler portion. In this context, the final goal is to ensure that the portion of a compiler actually executed during a safety application build has been validated and meets or exceeds the requirements of the standards.

The approach disclosed herein therefore reduces complexity of the toolchain qualification activity by focusing only on the portion of a compiler involved during the compilation of functional safety related software. This allows analysis of a reduced percentage of compiler code coverage, given that such percentage embraces all the code used in the safety related software compilation. This also provides a flexibility to the customer to perform an incremental qualification based on the changes in compiler flags through the software development life cycle.

Compliance with two kinds of compiler code coverage may be verified and tracked with the following techniques: first, with a tracking technique performed during the build of toolchain compiler specific validation test suite; and second, with a tracking technique performed during the build of the actual FuSa related software application with the compiler. The following techniques may also involve automation to collect code coverage and the invoked (e.g., stimulated or used) portion of a compiler in a form of one or more reports. Accordingly, automation (e.g., scripting) can be used to compare a portion of a compiler that was invoked during the build of a validation test suite versus the portion of the compiler that was invoked during a build of functional safety software.

As will be understood, the following examples of compiler usage and functional safety compliance may be applicable to a variety of development settings, and may assist many assurances of FuSa compliance with a variety of FuSa standards. For instance, companies may produce a safety manual that calls out the compilers used to qualify their software. Reference to the compiler qualification record may also be obtained on demand.

As will be understood, obtaining a high level of code coverage during compiler tool chain validation can become very expensive. The effort that is required to evaluate and test code dramatically increases as a function of the amount of code. Thus, the amount of effort required to achieve e.g., 95% code coverage is dramatically larger (often, exponentially larger) than the amount of effort to achieve e.g., 90% code coverage. Likewise, the amount of incremental value (return on investment) dramatically slows down as the code coverage increases.

Adopting a newer version of a compiler may require considerable effort, so the adoption of latest and most featured compiler capabilities in functional safety projects might be slow and expensive. This can have the side effect that, known bugs and security flaws might be fixed with delay, and the usage of open source maintained compilers (e.g., GCC) for functional safety projects would be very difficult. Likewise, qualification of all the possible compiler flags used in a compiler would lead to an exponential increase in test cases, thereby making it very expensive and time-consuming.

FIG. 1 illustrates a flowchart 100 of an example workflow to certify a compiler. This workflow may be implemented by compiler manufacturers and vendors to qualify an existing compiler tool suite. Enabling this feature in a compiler can include, for example, generate and use of a report to show how many and which compiler source code lines have been executed.

In this example workflow, multiple configuration elements are used as follows:

First, the compiler is instrumented at 110 to generate the required report(s) (e.g., a code coverage and tested source code lines report). In an example, the report(s) are generated by enabling specific flags during the compiler build phase. By enabling this compiler feature, the compiler will generate a source code lines report showing how many and which compiler source code lines have been executed.

Second, a compiler-specific validation test suite is built at 120 using the instrumented compiler. Some examples of validation test suites are Csmith (an open source tool), Plum Hall (a commercial tool), or Perennial (a commercial tool). For instance, a Toolchain Testsuite Code Coverage (TTCC) report is created from the test suite at 130. This TTCC report shows which lines of source code have been invoked (stimulated or used) during the validation test suite build.

Third, the validation test suite is executed at 140, and an evaluation is performed at 150 to determine if the compiler behavior is as expected. In particular, the validation test suite checks the invoked lines of source code stated in the previously generated report (the TTCC report). In case of failure where the compiler behavior is not expected, compiler bugs are fixed at 160 and the workflow can repeat the execution of the validation test suite at 140.

Fourth, if the TTCC target is met for the compiler (e.g., 99% of coverage) at 170, then the compiler can be used to build safety related software application at 190. If the TTCC target is not met for the compiler at 170, then new test cases are added at 180 and the workflow can repeat the execution of the validation test suite at 140.

Figure 2:
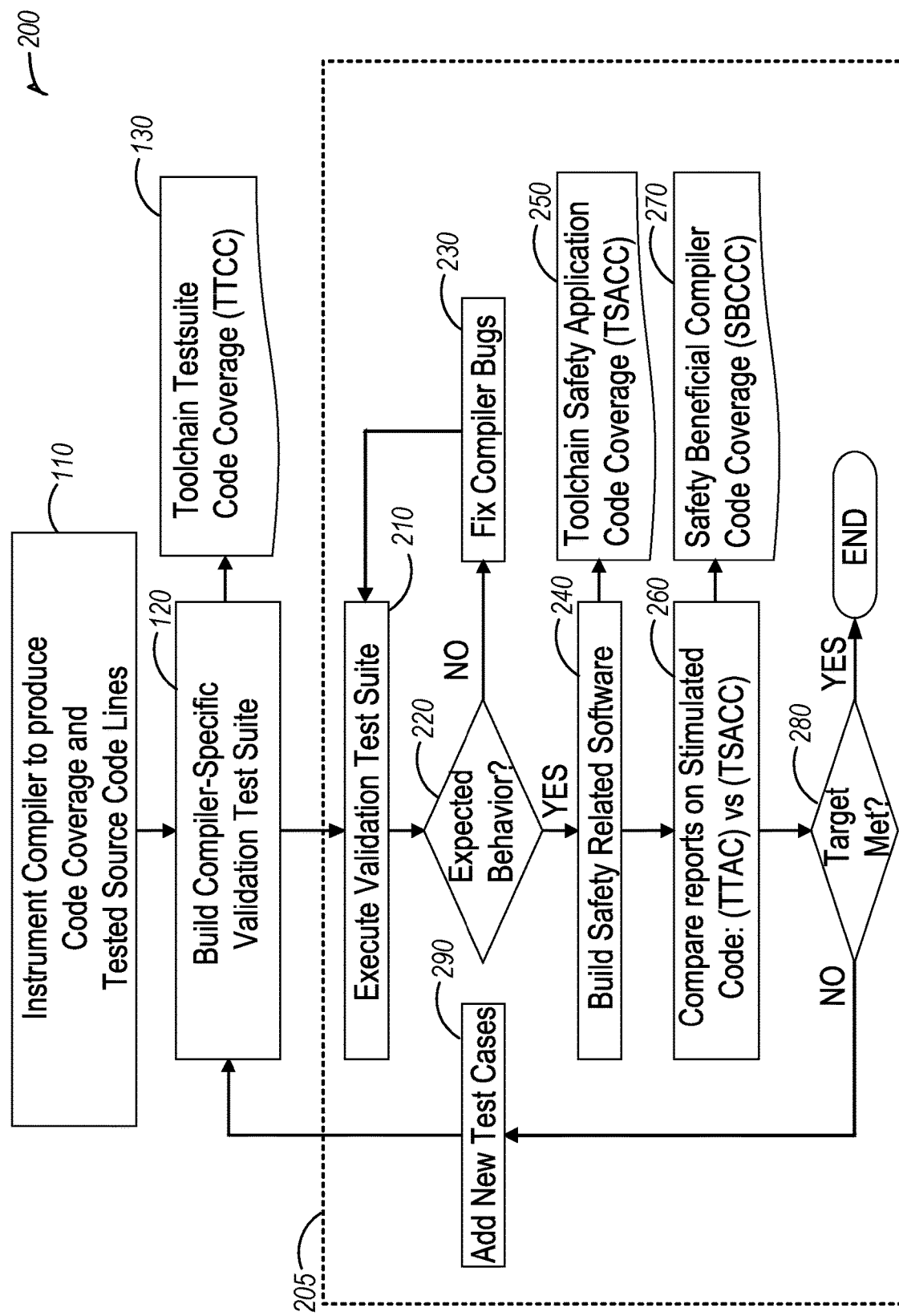
FIG. 2 illustrates an enhanced workflow to qualify a compiler tool suite, according to an example.

FIG. 2 illustrates a flowchart 200 of an enhanced workflow to qualify a compiler tool suite, building on the compilation workflow of FIG. 1. The flowchart 200 is depicted to include operations 110, 120, and 130 in a similar manner as discussed for flowchart 100. However, a portion 205 of the workflow introduces additional elements that enhance the compilation workflow.

First, the compiler is instrumented at 110 to generate the required reports (e.g., a code coverage and tested source code lines report). As noted above, the report(s) may be generated by enabling specific flags during the compiler build phase.

Second, the compiler validation test suite is built at 120 using the instrumented compiler. As noted above, examples of validation test suites are Csmith (an open source tool), Plum Hall (a commercial tool), or Perennial (a commercial tool). A Toolchain Testsuite Code Coverage (TTCC) report is created from the test suite at 130. This TTCC report shows which lines of source code have been invoked (stimulated or used) during the validation test suite build.

Third, the validation test suite is executed at 210 and an evaluation is performed at 220 to determine if the compiler behavior is as expected. In particular, the validation test suite checks the invoked (stimulated or used) lines of source code stated in the previously generated report (the TTCC report). In case of failure where the compiler behavior is not expected, compiler bugs are fixed at 160 and the workflow can repeat the execution of the validation test suite at 210.

Fourth, the safety related software is built at 240 using the instrumented compiler. During the build process of the safety related software, a new compiler code coverage report is generated at 250. This compiler code coverage report is referred to herein as a Toolchain Safety Application Code Coverage (TSACC) report. The TSACC report shows which lines of source code of the compiler have been invoked (stimulated or used) during the build process of the safety related software.

Fifth, TTCC and TSACC reports are compared at 260 to identify whether compiler lines of source code are both validated (i.e., they are listed in the TTCC report) and are invoked (stimulated or used) during safety related software build (i.e., the lines of source code that are listed in the TSACC report). The result of this comparison is produced at 270, and this result is referred to as Safety Beneficial Compiler Code Coverage (SBCCC).

Finally, an evaluation is performed at 280 to determine if a target for the SBCCC is met (or exceeded). If the SBCCC target is met (or exceeded), then the compiler can be validated as compliant and used to build the safety related software application; otherwise, new test cases need to be added at 290.

Thus, with the simplified flow provided in FIG. 2, there is no need to achieve very high TTCC by itself with a compiler validation suite. The objective instead is to ensure that the portion of the compiler which actually executed during the build of the safety application has been validated.

Based on the application of this methodology in an example FuSa project, even if the compiler validation suite covers only 30% of overall compiler source code, that validation suite may still invoke 97.5% of the compiler portion being used during safety related application build. The reason is because the safety related software only used a small part of compiler features that, even if not fully validated, do not affect the functional safety related software.

Among other benefits, the approaches above can enable a customer to freely select the tool for generating TTCC reports and enhance the evaluation of SBCCC through the software development life cycle. It also enables a customer to choose powerful compilers with enhanced features with minimal investment for developing their SBCCC test suite.

As will be understood, supplementary activities may be required to comply with toolchain requirements mandated by FuSa standards not explicitly mentioned herein. Further, as used herein, "code coverage" is used to generally refer to a statement, function, path, branch, or condition coverage, or any other kind of source code metric coverage. It is beyond the scope of this document to define which metric should be used. Likewise, as used herein, a code coverage "report" may be represented by a variety of types and formats of data, including a file, data structure, list or listing, database or database entry, and the like.

Figure 3:
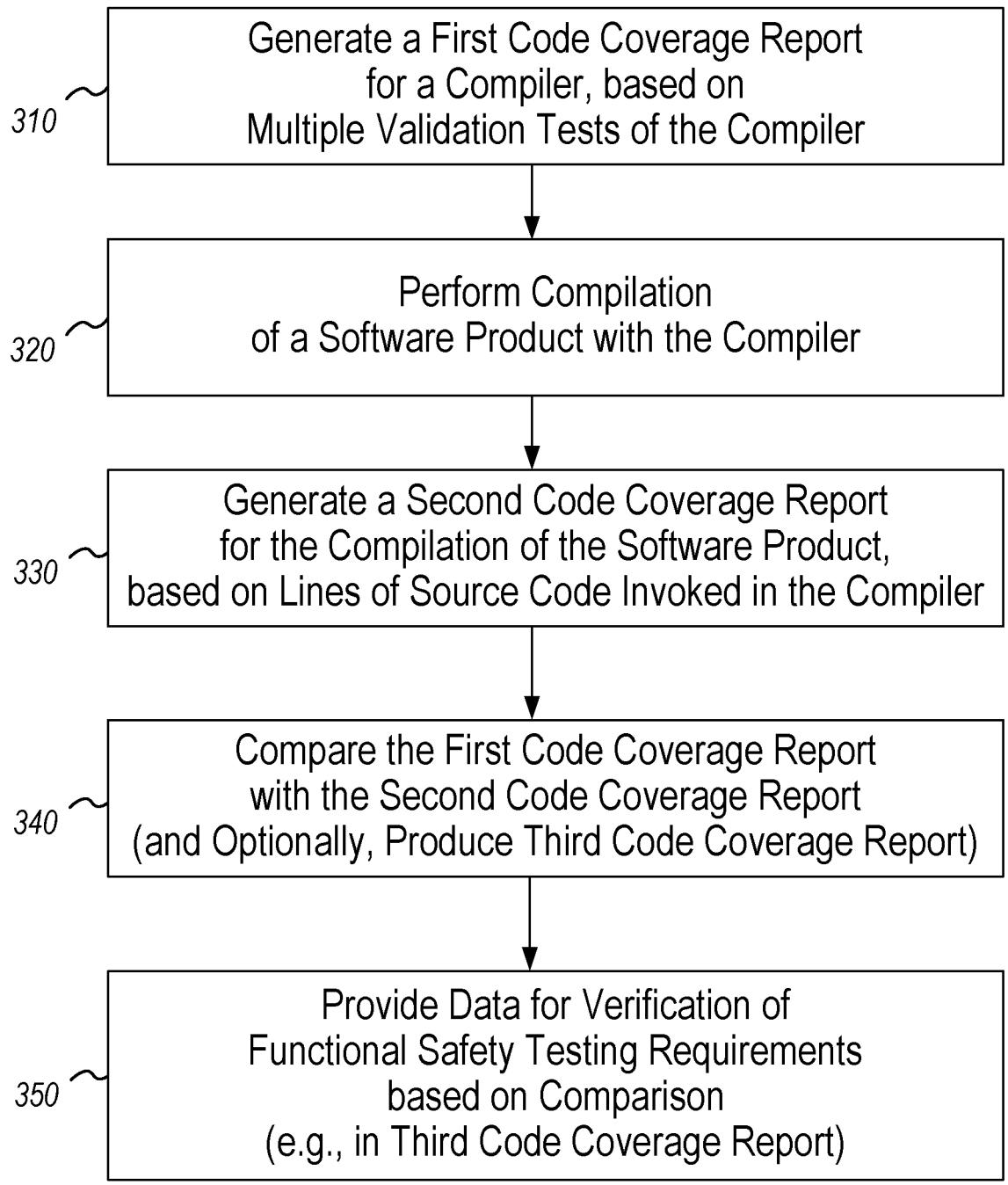
FIG. 3 illustrates a flowchart of an example method for validation testing of a compiler and safety-related software, according to an example.

FIG. 3 illustrates a flowchart 300 of an example method for verification of functional safety testing requirements in connection with compilation of a software product. The method may implement the operations of FIGS. 1 and 2, or a variation of such operations. In an example, the method may be implemented in a computing system including a memory device (e.g., storage memory such as non-volatile memory, or in volatile memory) that stores processing instructions and data, and processing circuitry (e.g., at least one processor) that executes processing instructions. In another example, the method may be implemented by at least one non-transitory machine-readable medium capable of storing instructions, where the instructions when executed by at least one processor cause the at least one processor to perform the method.

The flowchart begins at 310 with operations to generate a first code coverage report (or other data representation) for a compiler. The first code coverage report is produced based on a plurality of validation tests that are established for the compiler. The first code coverage report may be generated based on validation test data that provides the plurality of validation tests for the compiler.

In a further example, the compiler is instrumented (e.g., as in 110) to produce the code coverage report (or other data representation) for the compiler. The code coverage report can indicate the lines of source code for the compiler to be tested with at least one validation test suite specific to the compiler. For instance, the validation test suite may include the plurality of validation tests that are established for the compiler. Further operations may include performing an execution of the validation test suite for the compiler (e.g., as in 210) and generating the first code coverage report based on the execution of the validation test suite. Thus, a plurality of validation tests may be executed on the compiler, and the results of executing the plurality of validation tests may be evaluated and/or validated (e.g., as in 220), prior to the following operations that perform compilation of the software product with the compiler.

The flowchart continues at 320 by performing a compilation (or, causing the compilation) of a software product with the compiler (e.g., as 240). In an example, the software product relates to at least one functional safety operation. In a further example, the software product is one of: a software application, a software library, a middleware software component, or an operating system.

The flowchart continues at 330 by generating a second code coverage report (or other data representation) for the compilation of the software product, based on the particular lines of source code for the compiler that are invoked during the compilation of the software product.

The flowchart continues at 340 by comparing the first code coverage report for the compiler with the second code coverage report for the compilation of the software product (e.g., as in 260). In an example, the comparison of the first code coverage report for the compiler with the second code coverage report for the software product is based on compliance with a functional safety-related specification. For instance, the functional safety-related specification may be provided by a standard defined in one of: ISO 26262, IEC 61508, or RTCA DO-178C.

The flowchart completes at 350 by providing (e.g., outputting) data to provide verification results of functional safety testing requirements, based on the result of the comparison (at 340). The verification results may provide data that can indicate or represent a (i) compliance of the compiler with the functional safety-related specification, (ii) failure of the compiler to comply with the functional safety-related specification, or (iii) another identifiable status. In a specific example, the output data includes a third code coverage report (or other data representation), and this third code coverage report is generated based on the result of comparing the first code coverage report with the second code coverage report. Further evaluation of this third code coverage report or other target metrics may be performed.

In specific examples, the first code coverage report in the flowchart 300 of FIG. 3 is a toolchain testsuite code coverage (TTCC) report (e.g., as in 130), the second code coverage report is a toolchain safety application code coverage (TSACC) report (e.g., as in 250), and the third code coverage report is a safety beneficial compiler code coverage (SBCCC) report (e.g., as in 270). Other types of code coverage or software analysis reports may be used, evaluated, and generated.

Figure 4:
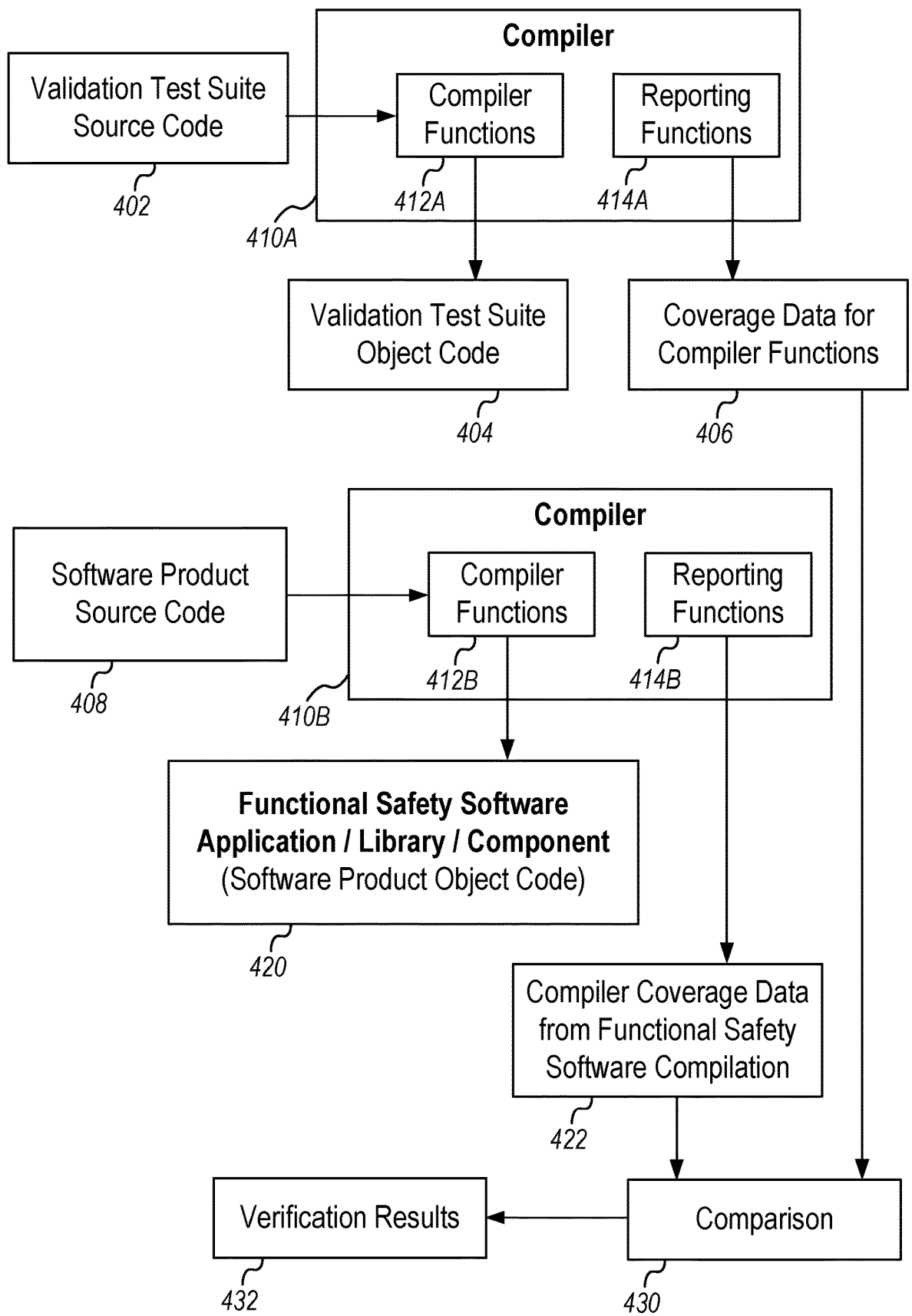
FIG. 4 is a block diagram illustrating an example configuration of a compiler to produce safety-related software, according to an example.

FIG. 4 is a block diagram illustrating a configuration of a compiler to produce safety-related software, according to an example. Here, this block diagram depicts inputs and outputs based on the workflow of FIG. 2 and the method for validation testing of FIG. 3.

As shown in FIG. 4, the compiler 410A is depicted to receive validation test suite source code 402. The compiler functions 412A are used to perform compilation of the source code into object code, shown in FIG. 4 as validation test suite object code 404. The compiler 410A also includes reporting functions 414A to track the use of the compiler functions 412A executed during compilation. The reporting functions 414A are shown to produce code coverage data 406 for the compiled validation tests.

For simplicity, FIG. 4 does not depict the use of the validation test suite object code 404, which is run to validate the correct compiler behavior. As discussed above, if the execution of the validation test suite object code 404 returns faulty or unexpected results, the next phases will be invalidated or postponed until the validation test suite object code 404 is successful (e.g., either by fixing the compiler or the test suite).

The compiler 410B is depicted to receive software product source code 408. The compiler functions 412B are used to perform compilation of the source code into object code, shown in FIG. 4 as a functional safety software application, library, or component 420. The compiler 410B also includes reporting functions 414B to track the use of the compiler functions 412B during compilation. The reporting functions 414B are shown to produce second code coverage data 422 for the compiled functional safety software.

The first coverage data 406 and the second coverage data 422 are evaluated with a comparison 430. The comparison is used 430 to output third code coverage data 432 such as in the form of verification results. Additional functional safety testing or validation operations may be performed based on these verification results 432.

Embodiments to implement the approaches above may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media (e.g., represented in portions of computer system 500 in FIG. 5, discussed below).

A processor subsystem (e.g., processor 502 in FIG. 5, discussed below) may be used to execute the instruction on the—readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Such components may be hardware, software, or firmware communicatively coupled to one or more processors in order to carry out the operations described herein. Components may be hardware components, and as such components may be considered tangible entities capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium. In an example, the software, when executed by the underlying hardware of the component, causes the hardware to perform the specified operations. Accordingly, a hardware component is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software; the general-purpose hardware processor may be configured as respective different components at different times. Software may accordingly configure a hardware processor, for example, to constitute a particular component at one instance of time and to constitute a different component at a different instance of time. Components may also be software or firmware implementations, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or components may, collectively or individually, be embodied as circuitry that forms part of a larger system, for example, an integrated circuit (IC), system on-chip (SoC), desktop computers, laptop computers, tablet computers, servers, smart phones, etc.

As used in the present disclosure, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 5:
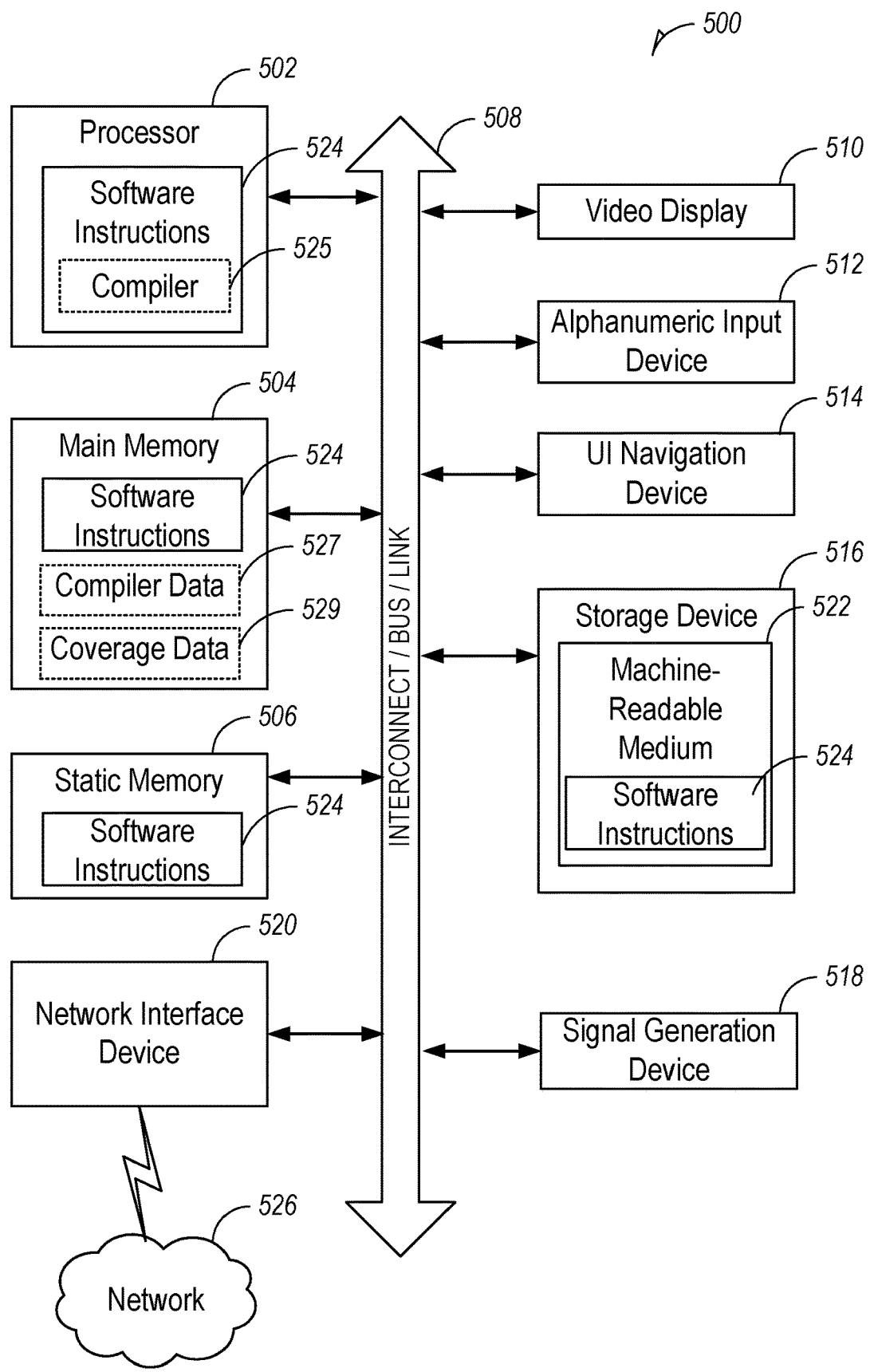
FIG. 5 is a block diagram illustrating an example machine upon which any one or more of the techniques (e.g., methodologies) discussed herein may perform, according to an example.

"Circuitry," as used in the present disclosure, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 5 is a block diagram illustrating a machine in the example form of a computer system 500, within which a set or sequence of instructions may be executed to cause the machine to perform any one of the methodologies discussed herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a smartphone or other mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., interconnect or bus). The computer system 500 may further include a video display unit 510, an alphanumeric input device 512 (e.g., a keyboard), and a user interface (UI) navigation device 514 (e.g., a mouse). In one aspect, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, gyrometer, magnetometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media. As an example, the software instructions 524 may include instructions to implement and execute a compiler 525 via the processor (e.g., a compiler as configured and operated in the examples of FIGS. 1 to 4). As a further example, the main memory 504 (or the other memory or storage 506, 516) may host various data used with the compiler 525 or the other processing operations discussed herein, such as compiler data 527 or coverage data 529.

While the machine-readable medium 522 is illustrated in an example aspect to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, 6G, DSRC, or satellite communication networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Additional examples of the presently described embodiments include the following, non-limiting implementations. Each of the following non-limiting examples may stand on its own or may be combined in any permutation or combination with any one or more of the other examples provided below or throughout the present disclosure.

Example 1 is a computing system, comprising: a memory device to store data including first code coverage data for a compiler, the first code coverage data based on a plurality of validation tests of the compiler; and processing circuitry: cause compilation of a software product with the compiler; generate second code coverage data for the compilation of the software product, based on lines of source code for the compiler that are invoked during the compilation of the software product; perform a comparison of the first code coverage data for the compiler with the second code coverage data for the compilation of the software product; and output data to provide verification results of functional safety testing requirements, based on the comparison.

In Example 2, the subject matter of Example 1 optionally includes subject matter where the output data includes third code coverage data, and wherein the processing circuitry is further to generate the third code coverage data based on the comparison of the first code coverage data with the second code coverage data.

In Example 3, the subject matter of Example 2 optionally includes subject matter where the first code coverage data is a toolchain testsuite code coverage (TTCC) report, wherein the second code coverage data is a toolchain safety application code coverage (TSACC) report, and wherein the third code coverage data is a safety beneficial compiler code coverage (SBCCC) report.

In Example 4, the subject matter of any one or more of Examples 1-3 optionally include the processing circuitry further to: instrument the compiler to produce the first code coverage data for the compiler, wherein the first code coverage data indicates lines of source code for the compiler to be tested with at least one validation test suite specific to the compiler, and wherein the validation test suite includes the plurality of validation tests for the compiler.

In Example 5, the subject matter of Example 4 optionally includes the processing circuitry further to: execute the validation test suite for the compiler; and generate the first code coverage data based on execution of the validation test suite.

In Example 6, the subject matter of any one or more of Examples 1-5 optionally include subject matter where the memory device further stores validation test data that provides the plurality of validation tests for the compiler; and wherein the processing circuitry is further to execute the plurality of validation tests on the compiler and validate results of executing the plurality of validation tests prior to the compilation of the software product with the compiler.

In Example 7, the subject matter of any one or more of Examples 1-6 optionally include subject matter where the software product relates to at least one functional safety operation, and wherein the comparison of the first code coverage data for the compiler with the second code coverage data for the software product is based on compliance with a functional safety-related specification.

In Example 8, the subject matter of Example 7 optionally includes subject matter where the functional safety-related specification is provided by a standard defined in one of: ISO 26262, IEC 61508, or RTCA DO-178C.

In Example 9, the subject matter of any one or more of Examples 7-8 optionally include subject matter where the verification results comprise (e.g., represent or indicate) (i) compliance of the compiler with the functional safety-related specification, or (ii) failure of the compiler to comply with the functional safety-related specification.

In Example 10, the subject matter of any one or more of Examples 7-9 optionally include subject matter where the software product is one of: a software application, a software library, a middleware software component, or an operating system.

Example 11 is at least one non-transitory machine-readable medium capable of storing instructions for verification of functional safety testing requirements with compilation of a software product, wherein the instructions when executed by at least one processor cause the at least one processor to: obtain first code coverage data for a compiler, the first code coverage data based on a plurality of validation tests of the compiler; perform compilation of the software product with the compiler; generate second code coverage data for the compilation of the software product, based on lines of source code for the compiler that are invoked during the compilation of the software product; perform a comparison of the first code coverage data for the compiler with the second code coverage data for the compilation of the software product; and output data to provide verification results of the functional safety testing requirements, based on the comparison.

In Example 12, the subject matter of Example 11 optionally includes subject matter where the output data includes third code coverage data, and wherein the instructions further cause the at least one processor to generate the third code coverage data based on the comparison of the first code coverage data with the second code coverage data.

In Example 13, the subject matter of Example 12 optionally includes subject matter where the first code coverage data is a toolchain testsuite code coverage (TTCC) report, wherein the second code coverage data is a toolchain safety application code coverage (TSACC) report, and wherein the third code coverage data is a safety beneficial compiler code coverage (SBCCC) report.

In Example 14, the subject matter of any one or more of Examples 11-13 optionally include subject matter where the instructions further cause the at least one processor to: instrument the compiler to produce the first code coverage data for the compiler, wherein the first code coverage data indicates lines of source code for the compiler to be tested with at least one validation test suite specific to the compiler, and wherein the validation test suite includes the plurality of validation tests for the compiler.

In Example 15, the subject matter of Example 14 optionally includes subject matter where the instructions further cause the at least one processor to: execute the validation test suite for the compiler; and generate the first code coverage data based on execution of the validation test suite.

In Example 16, the subject matter of any one or more of Examples 11-15 optionally include subject matter where the instructions further cause the at least one processor to: obtain validation test data that provides the plurality of validation tests for the compiler; and execute the plurality of validation tests on the compiler and validate results of executing the plurality of validation tests prior to the compilation of the software product with the compiler.

In Example 17, the subject matter of any one or more of Examples 11-16 optionally include subject matter where the software product relates to at least one functional safety operation, and wherein the comparison of the first code coverage data for the compiler with the second code coverage data for the software product is based on compliance with a functional safety-related specification.

In Example 18, the subject matter of Example 17 optionally includes subject matter where the functional safety-related specification is provided by a standard defined in one of: ISO 26262, IEC 61508, or RTCA DO-178C.

In Example 19, the subject matter of any one or more of Examples 17-18 optionally include subject matter where the verification results comprise (e.g., represent or indicate) (i) compliance of the compiler with the functional safety-related specification, or (ii) failure of the compiler to comply with the functional safety-related specification.

In Example 20, the subject matter of any one or more of Examples 17-19 optionally include subject matter where the software product is one of: a software application, a software library, a middleware software component, or an operating system.

Example 21 is an apparatus, comprising: means for generating a first code coverage report for a compiler, the first code coverage report based on a plurality of validation tests of the compiler; means for executing the compiler to cause compilation of a software product; means for generating a second code coverage report for the compilation of the software product, based on lines of source code for the compiler that are invoked during the compilation of the software product; and means for verifying functional safety testing requirements based on a comparison of the first code coverage report for the compiler with the second code coverage report for the compilation of the software product.

In Example 22, the subject matter of Example 21 optionally includes means for generating a third code coverage report based on the comparison of the first code coverage report with the second code coverage report; wherein the software product relates to at least one functional safety operation, and wherein the comparison of the first code coverage report for the compiler with the second code coverage report for the software product is based on compliance with a functional safety-related specification.

Example 23 is a method for verification of functional safety testing requirements with compilation of a software product, comprising: obtaining first code coverage data for a compiler, the first code coverage data based on a plurality of validation tests of the compiler; performing compilation of a software product with the compiler; generating second code coverage data for the compilation of the software product, based on lines of source code for the compiler that are invoked during the compilation of the software product; comparing the first code coverage data for the compiler with the second code coverage data for the compilation of the software product; and outputting data to provide verification results of the functional safety testing requirements, based on the comparing.

In Example 24, the subject matter of Example 23 optionally includes subject matter where the output data includes third code coverage data, and wherein the method further comprises generating the third code coverage data based on the comparing of the first code coverage data with the second code coverage data.

In Example 25, the subject matter of Example 24 optionally includes subject matter where the first code coverage data is a toolchain testsuite code coverage (TTCC) report, wherein the second code coverage data is a toolchain safety application code coverage (TSACC) report, and wherein the third code coverage data is a safety beneficial compiler code coverage (SBCCC) report.

In Example 26, the subject matter of any one or more of Examples 23-25 optionally include instrumenting the compiler to produce the first code coverage data for the compiler, wherein the first code coverage data indicates lines of source code for the compiler to be tested with at least one validation test suite specific to the compiler, and wherein the validation test suite includes the plurality of validation tests for the compiler.

In Example 27, the subject matter of Example 26 optionally includes executing the validation test suite for the compiler; and generating the first code coverage data based on the executing of the validation test suite.

In Example 28, the subject matter of any one or more of Examples 23-27 optionally include obtaining validation test data that provides the plurality of validation tests for the compiler; and executing the plurality of validation tests on the compiler and validating results of executing the plurality of validation tests prior to the compilation of the software product with the compiler.

In Example 29, the subject matter of any one or more of Examples 23-28 optionally include subject matter where the software product relates to at least one functional safety operation, and wherein the comparing of the first code coverage data for the compiler with the second code coverage data for the software product is based on compliance with a functional safety-related specification.

In Example 30, the subject matter of Example 29 optionally includes subject matter where the functional safety-related specification is provided by a standard defined in one of: ISO 26262, IEC 61508, or RTCA DO-178C.

In Example 31, the subject matter of any one or more of Examples 29-30 optionally include subject matter where the verification results comprise (e.g., represent or indicate) (i) compliance of the compiler with the functional safety-related specification, or (ii) failure of the compiler to comply with the functional safety-related specification.

In Example 32, the subject matter of any one or more of Examples 29-31 optionally include subject matter where the software product is one of: a software application, a software library, a middleware software component, or an operating system.

Example 33 is an apparatus, comprising respective means for causing, implementing, deploying, validating, or using a functional safety verification of a software compiler and a compiled software product, in accordance with Examples 1-32, or the other techniques discussed herein.

Example 34 is a system comprising respective components arranged or configured to perform any of the operations or techniques for functional safety verification of a software compiler and a compiled software product, in accordance with Examples 1-32, or discussed herein.

Example 35 is a method, performed using specially configured circuitry of a device, arranged or configured to perform any of the operations or techniques for functional safety verification of a software compiler and a compiled software product, in accordance with Examples 1-32, or discussed herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate aspect. The scope of the embodiments disclosed herein is to be determined with reference to the appended claims, along with the full scope of equivalents to which such claims are entitled.

What is claimed is:

1. A computing system, comprising:
   a memory device to store data including first code coverage data for a compiler, the first code coverage data based on a plurality of validation tests of the compiler; and
   processing circuitry:
   cause compilation of a software product with the compiler;
   generate second code coverage data for the compilation of the software product, based on lines of source code for the compiler that are invoked during the compilation of the software product;
   perform a comparison of the first code coverage data for the compiler with the second code coverage data for the compilation of the software product; and
   output data to provide verification results of functional safety testing requirements, based on the comparison.

2. The computing system of claim 1, wherein the output data includes third code coverage data, and wherein the processing circuitry is further to generate the third code coverage data based on the comparison of the first code coverage data with the second code coverage data.

3. The computing system of claim 2, wherein the first code coverage data is a toolchain testsuite code coverage (TTCC) report, wherein the second code coverage data is a toolchain safety application code coverage (TSACC) report, and wherein the third code coverage data is a safety beneficial compiler code coverage (SBCCC) report.

4. The computing system of claim 1, the processing circuitry further to:
instrument the compiler to produce the first code coverage data for the compiler, wherein the first code coverage data indicates lines of source code for the compiler to be tested with at least one validation test suite specific to the compiler, and wherein the validation test suite includes the plurality of validation tests for the compiler.

5. The computing system of claim 4, the processing circuitry further to:
execute the validation test suite for the compiler; and
generate the first code coverage data based on execution of the validation test suite.

6. The computing system of claim 1, wherein the memory device further stores validation test data that provides the plurality of validation tests for the compiler; and
wherein the processing circuitry is further to execute the plurality of validation tests on the compiler and validate results of executing the plurality of validation tests prior to the compilation of the software product with the compiler.

7. The computing system of claim 1, wherein the software product relates to at least one functional safety operation, and wherein the comparison of the first code coverage data for the compiler with the second code coverage data for the software product is based on compliance with a functional safety-related specification.

8. The computing system of claim 7, wherein the functional safety-related specification is provided by a standard defined in one of: ISO 26262, IEC 61508, or RTCA DO-178C.

9. The computing system of claim 7, wherein the verification results comprise (i) compliance of the compiler with the functional safety-related specification, or (ii) failure of the compiler to comply with the functional safety-related specification.

10. The computing system of claim 7, wherein the software product is one of: a software application, a software library, a middleware software component, or an operating system.

11. At least one non-transitory machine-readable medium capable of storing instructions for verification of functional safety testing requirements with compilation of a software product, wherein the instructions when executed by at least one processor cause the at least one processor to:
obtain first code coverage data for a compiler, the first code coverage data based on a plurality of validation tests of the compiler;
perform compilation of the software product with the compiler;
generate second code coverage data for the compilation of the software product, based on lines of source code for the compiler that are invoked during the compilation of the software product;
perform a comparison of the first code coverage data for the compiler with the second code coverage data for the compilation of the software product; and
output data to provide verification results of the functional safety testing requirements, based on the comparison.

12. The non-transitory machine-readable medium of claim 11, wherein the output data includes third code coverage data, and wherein the instructions further cause the at least one processor to generate the third code coverage data based on the comparison of the first code coverage data with the second code coverage data.

13. The non-transitory machine-readable medium of claim 12, wherein the first code coverage data is a toolchain testsuite code coverage (TTCC) report, wherein the second code coverage data is a toolchain safety application code coverage (TSACC) report, and wherein the third code coverage data is a safety beneficial compiler code coverage (SBCCC) report.

14. The non-transitory machine-readable medium of claim 11, wherein the instructions further cause the at least one processor to:
instrument the compiler to produce the first code coverage data for the compiler, wherein the first code coverage data indicates lines of source code for the compiler to be tested with at least one validation test suite specific to the compiler, and wherein the validation test suite includes the plurality of validation tests for the compiler.

15. The non-transitory machine-readable medium of claim 14, wherein the instructions further cause the at least one processor to:
execute the validation test suite for the compiler; and
generate the first code coverage data based on execution of the validation test suite.

16. The non-transitory machine-readable medium of claim 11, wherein the instructions further cause the at least one processor to: obtain validation test data that provides the plurality of validation tests for the compiler; and
execute the plurality of validation tests on the compiler and validate results of executing the plurality of validation tests prior to the compilation of the software product with the compiler.

17. The non-transitory machine-readable medium of claim 11, wherein the software product relates to at least one functional safety operation, and wherein the comparison of the first code coverage data for the compiler with the second code coverage data for the software product is based on compliance with a functional safety-related specification.

18. The non-transitory machine-readable medium of claim 17, wherein the functional safety-related specification is a standard defined in one of: ISO 26262, IEC 61508, or RTCA DO-178C.

19. The non-transitory machine-readable medium of claim 17, wherein the verification results represent (i) compliance of the compiler with the functional safety-related specification, or (ii) failure of the compiler to comply with the functional safety-related specification.

20. The non-transitory machine-readable medium of claim 17, wherein the software product is one of: a software application, a software library, a middleware software component, or an operating system.

* * * * *